United States Patent [19]

Friesen

[11] 4,177,604
[45] Dec. 11, 1979

[54] DRIP-ACTION HYDROPONIC GARDEN
[76] Inventor: David L. Friesen, 3667 35th St., San Diego, Calif. 92104
[21] Appl. No.: 850,779
[22] Filed: Nov. 11, 1977
[51] Int. Cl.² .................... A01G 31/00; B67D 5/08
[52] U.S. Cl. .............................................. 47/62; 47/79
[58] Field of Search .................. 47/79, 80, 63, 62, 59, 47/66, 81, 64

[56] References Cited

U.S. PATENT DOCUMENTS

| 2,062,755 | 12/1936 | Lyons et al. | 47/62 |
| 2,188,875 | 1/1940 | Ellis | 47/62 X |
| 3,686,792 | 8/1972 | Barfield | 47/79 X |
| 4,006,843 | 2/1977 | Martinez | 47/79 |

FOREIGN PATENT DOCUMENTS

| 734311 | 5/1966 | Canada | 47/79 |
| 550799 | 4/1932 | Fed. Rep. of Germany | 47/79 |
| 2336739 | 7/1973 | Fed. Rep. of Germany | 47/79 |
| 2632405 | 7/1976 | Fed. Rep. of Germany | 47/79 |
| 116795 | 7/1946 | Sweden | 47/79 |
| 1605 | of 1888 | United Kingdom | 47/80 |
| 832983 | 4/1960 | United Kingdom | 47/79 |
| 958150 | 5/1964 | United Kingdom | 47/79 |
| 183529 | 12/1964 | U.S.S.R. | 47/62 |

Primary Examiner—E. H. Eickholt

[57] ABSTRACT

A hydroponic gardening system and apparatus particularly adapted for small scale use and versatility wherein a steady supply of hydroponic liquid is supplied according to the drip irrigation method to individual plant containers, each of such containers being directly connected through a drain hole and tube in the bottom thereof to a common drain pipe emptying into a liquid reservoir where the liquid is automatically pumped to an elevated tank, the individual plant receptacles being uniquely designed to be very simply removable from the entire system and being rotational in place as well.

2 Claims, 5 Drawing Figures

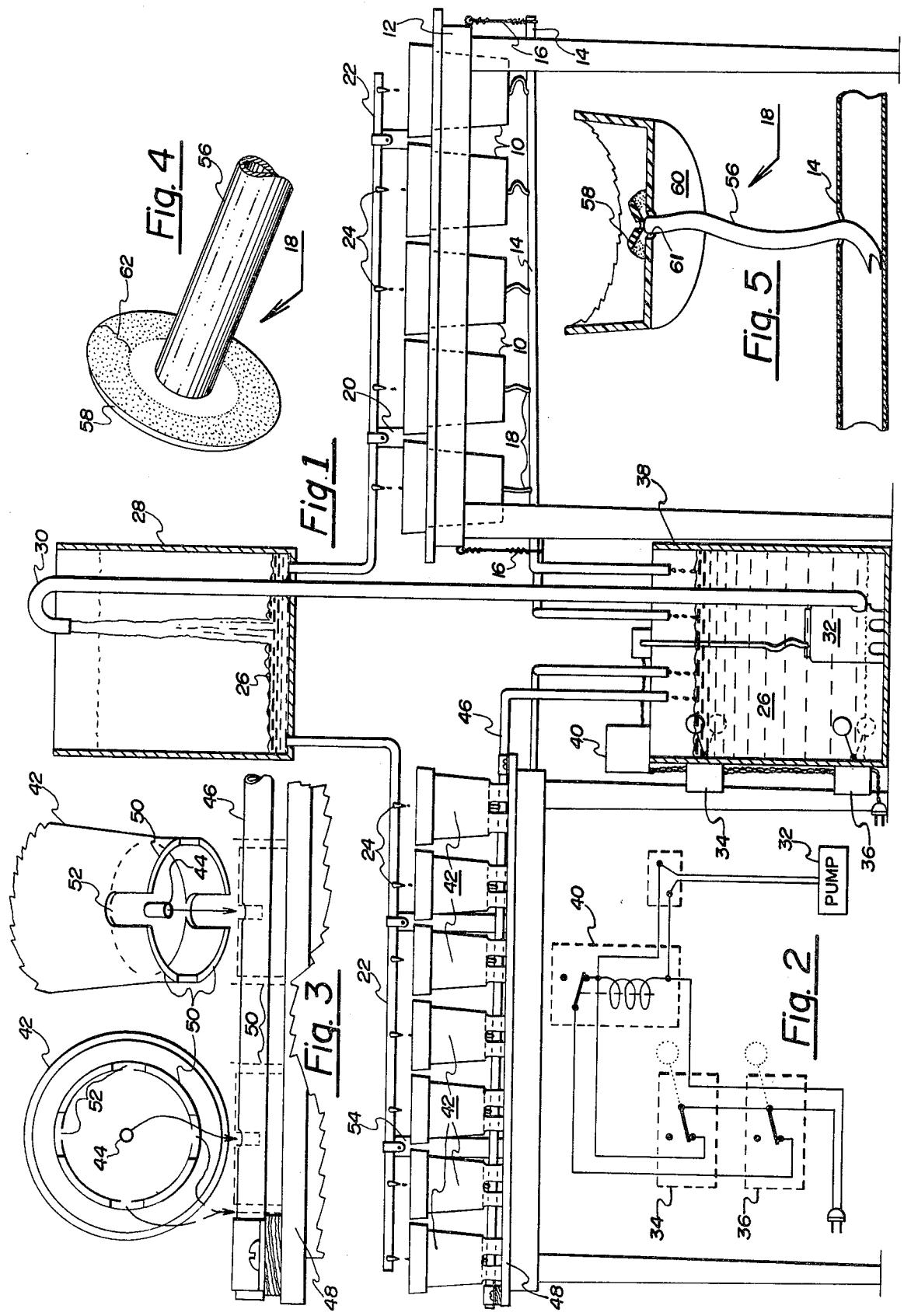

DRIP-ACTION HYDROPONIC GARDEN

BACKGROUND OF THE INVENTION

In the past few years hydroponic gardening has become increasingly popular with novices, and has attracted commercial attention as well. The concept of hydroponic gardening, which is to provide inert root support structure such as rocks or gravel with nutrient saturated water but no soil is coming of age with the advent of a generalized regional water shortage affecting the Western United States and the rapid development of the barren Middle Eastern oil lands.

The traditional hydroponic garden includes broad beds containing gravel and rocks to accomodate many plants. The hydroponic liquid, or fertilizer-saturated water, fills these broad plats twice a day or so and then permits them to drain off again so the plant roots do not remain submerged.

Plants grown in such a system develop faster and more perfectly than plants grown in the fields, and the general principles of hydroponic gardening are unquestionable. There remain, adaptations of structure to the general principle which introduce hydroponic gardening into realms of new convenience and special application.

SUMMARY OF THE INVENTION

The present invention is such an adaptation of an hydroponic garden and is tailored specifically toward the needs of a small grower, and even one who grows from his porch or livingroom. This hydroponic system is characterized in that rather than a periodic flushing of the gravel or other root support structure with the hydroponic liquid, the liquid is supplied under a steady pressure to a drip irrigation system so that a constant but minute quantity of water is supplied to the root support structure.

In addition, rather than a multiplicity of plants in a broad, tremendously heavy planter, the present invention utilizes individual containers for each plant similar to the plant pots used for decorative plants in todays interior design. Each of these individual containers have the nipple on the bottom which permits the container to be coupled to a common drain line which has a hole to accept the nipple, and this arrangement permits irrigaton from the top by a drip line and drainage through the nipple into the common drainage pipe while at the same time permitting the container to be simply removed without disturbing the remainder of the apparatus.

Each of the containers is similar to a conventional flower pot but has a skirt around the bottom and the nipple, the skirt having four evenly spaced arched openings to permit the pot or container to seat over the drain line. This arrangement permits the plant to be positioned four different ways to compensate for irregular growth due, for example, to sun entering a room from one direction only.

BRIEF DESCRIPTION OF THE DRAWINGS

FIG. 1 is a diagrammatic view of two modifications of the entire system in operation;

FIG. 2 is a schematic view of the pump control mechanism;

FIG. 3 is a detail of the containers having the skirts and nipples showing the way they engage on the common drain line;

FIG. 4 shows a stub pipe having a collar adapted to be inserted into a conventional flower pot;

FIG. 5 illustrates a pot adapted with the stub pipe of FIG. 4 to a drain line.

DETAILED DESCRIPTION OF THE PREFERRED EMBODIMENT

FIG. 1 shows the entire system set up with two slightly modified types of plant containers. Taking first all the pots or containers of the type illustrated at 10 on right of the system, a rack 12 of any suitable kind is provided to support the row of pots 10 in a substantially horizontal arrangement. Beneath the rack 12 is shown in FIG. 1 a drain pipe 14 suspended from the rack by wires 16 at somewhat of an angle to promote proper drainage. Disposed periodically along this drain pipe are holes into which are inserted drain tubes 18 which connect to drain holes in the bottoms of the pots 10. These containers are filled with gravel or other solid particulate or granular material, not shown, to provide physical support for the roots of plants, also not shown. However, each container 10 ordinarily would contain a single plant.

Supported by braces 20 which connect to the rack 12 is a drip or irrigation line 22 which has periodically drip nozzles 24 which provide a slow, steady dripping of hydroponic liquid 26 into each of the containers 10.

Liquid is provided at a relatively steady pressure to the irrigation line 22 and drip nozzles by means of an elevated tank 28 which is filled by stand pipe 30 connected to the pump 32.

The control mechanism for the pumps is shown in FIG. 1 and is diagrammatically illustrated in FIG. 2, wherein the upper float switch 34 activates the motor which runs continuously until the lower float switch 36 is opened, which causes the circuit to remain open until the upper switch 34 once more is closed by the rise in the water level in the reservoir 38 which contains the motor and switches. A solenoid 40 is used in this arrangement as shown in FIG. 2 in a rather conventional on-off control mechanism for tanks of this type.

It is also possible of course that the standard alternative of the elevated tank 28, which is a pressurized tank, be used in its stead. As stated, the purpose of the tank is to provide a steady pressure water supply to the irrigation line so that a constant drip waters the root support rocks and the timing mechanism required to raise and lower the water level two or three times a day, such as is used in conventional hydroponic gardens, is dispensed with.

A further adaptation of the hydroponic gardening system is achieved by the provision of specially designed pots or containers 42 which are different from ordinary pots primarily in that they provide a downwardly extending stem or nipple 44 which engages in openings provided in drain pipe 46 which lies along the horizontal, or substantially horizontal, top of support table 48. These containers are supported above the top surface of this table by appropriate means such as the skirt 50 which rests on the table and has arched openings 52 disposed at 90 degree intervals around the skirt such that two pairs of openings are provided diametrically aligned with the nipple 44. As can be seen in FIG. 1, the containers usually slip over the drain pipe 46 such that the nipples 44 insert in the appropriate openings in the drain pipe, and because of the positioning of the irrigation line 22 on supports 54 above the table, these containers are easily removed from the table and the irrigation and drainage setups. The advantages of this easily removable and replaceable arrangement are as numerous as they are obvious. First, if the system is utilized in an area where some light is from one direction only and the plants tend to grow in that direction, by rotating the plants 90° daily the plants will tend to straighten up.

In addition, an arrangement could be provided for growing the most plants in a given area wherein several vertical rows of pots are provided above one another with different vertical clearance spaces to accomodate plants at different stages of maturity. There are a number of other reasons why one might want to remove an individual plant container, such as for weeding in the case alien seeds got in the planter somehow, or for removing a ripe plant, or one that is not doing well to replace it by a fresh one.

The system also includes an adaptor for modifying an existing conventional flower pot 60, shown in FIG. 5, so that it can be utilized either in the arrangement as 10 or 42. To do this a stub pipe or stem 56 having an integral collar 58 is inserted through the opening 61 in the bottom of the flower pot so that the collar seats around and seals this hole. An adhesive 62 could be provided on the collar for a sealed, permanent fit. As shown in FIG. 5, the stub pipe or stem is connected by means of a tube 18 to the drain pipe 14, but clearly the pot could also be arranged like 42 provided some sort of support be utilized for maintaining the container above the supporting surface.

The invention as thus described is ideal for small space utilization, such as in apartments or on patios, and is quite advanced from the standpoint of convenience due to the interchangeable planter containers and the simplified watering system which utilizes no periodic flooding and thus minimizes the cost and the chances for mechanical foul-ups of the watering system.

I claim:

1. A hydroponic gardening system comprising:
    (a) a plurality of plant pots, each having a central drain hole in the bottom thereof and being capable of holding root-engaging solids;
    (b) said pots each having a fluid receiving port and a drain nipple projecting from the bottom thereof; said drain nipple end comprising a stub pipe having an orthogonally related collar on one end thereof, said pipe being inserted through the hole in said pot from the inside such that said collar seals same;
    (c) a drip line operative to drip hydroponic liquid in said ports;
    (d) a drain pipe having a plurality of openings to receive said drain nipples from said pots; and
    (e) means to deliver liquid received by said drain pipe to said drip line.

2. Apparatus according to claim 1 and including an adhesive bonding said collar to said vessel.

* * * * *